United States Patent

Sakon et al.

[11] Patent Number: 5,897,948
[45] Date of Patent: Apr. 27, 1999

[54] SURFACE-TREATED STEEL SHEET WITH RESIN-BASED CHEMICAL TREATMENT COATING AND PROCESS FOR ITS PRODUCTION

[75] Inventors: Tadashi Sakon; Ikuo Jitsuhara; Kenichiro Tadokoro; Maki Sekoguchi; Hiromasa Shoji; Makoto Yamazaki, all of Kawasaki, Japan

[73] Assignee: Nippon Steel Corporation, Tokyo, Japan

[21] Appl. No.: 08/776,811

[22] PCT Filed: Jun. 17, 1996

[86] PCT No.: PCT/JP96/01663

§ 371 Date: Feb. 17, 1997

§ 102(e) Date: Feb. 17, 1997

[87] PCT Pub. No.: WO97/00337

PCT Pub. Date: Jan. 3, 1997

[30] Foreign Application Priority Data

| Jun. 15, 1995 | [JP] | Japan | 7-149199 |
| Jun. 15, 1995 | [JP] | Japan | 7-149200 |
| May 20, 1996 | [JP] | Japan | 8-124183 |
| May 20, 1996 | [JP] | Japan | 8-124184 |

[51] Int. Cl.$^6$ .................. B32B 5/16; B05D 3/02
[52] U.S. Cl. .................. 428/328; 427/189; 427/190; 428/330; 428/469; 428/471; 428/472; 428/697; 428/702
[58] Field of Search .................. 428/328, 330, 428/469, 471, 472, 682, 697, 702, 543; 427/189, 190

[56] References Cited

U.S. PATENT DOCUMENTS

| 4,659,394 | 4/1987 | Hara et al. | 148/6.2 |
| 4,775,600 | 10/1988 | Adaniya et al. | 428/623 |
| 4,842,958 | 6/1989 | Higuchi et al. | 428/629 |
| 4,853,285 | 8/1989 | Sobata et al. | 428/336 |
| 4,889,775 | 12/1989 | Adaniya et al. | 428/62 B |
| 4,891,273 | 1/1990 | Shima et al. | 428/623 |
| 4,897,317 | 1/1990 | Kanamaru et al. | 428/629 |
| 4,902,387 | 2/1990 | Takeuchi et al. | 204/28 |
| 4,910,097 | 3/1990 | Nomura et al. | 428/623 |
| 4,969,980 | 11/1990 | Yoshioka et al. | 204/28 |
| 4,970,126 | 11/1990 | Adaniya et al. | 428/623 |
| 5,061,575 | 10/1991 | Mohri et al. | 428/623 |
| 5,141,822 | 8/1992 | Matsuo et al. | 428/623 |
| 5,147,730 | 9/1992 | Ogishi et al. | 428/623 |
| 5,188,905 | 2/1993 | Shindou et al. | 428/626 |
| 5,242,572 | 9/1993 | Shindou et al. | 205/244 |
| 5,304,401 | 4/1994 | Shindou et al. | 427/410 |
| 5,366,567 | 11/1994 | Ogino et al. | 148/258 |
| 5,514,483 | 5/1996 | Sujita et al. | 428/623 |
| 5,700,561 | 12/1997 | Mano et al. | 428/327 |

FOREIGN PATENT DOCUMENTS

| 55-97478 | 7/1980 | Japan . |
| 61-231177 | 10/1986 | Japan . |
| 63-123472 | 5/1988 | Japan . |
| 63-179736 | 7/1988 | Japan . |
| 63-296870 | 12/1988 | Japan . |
| 1-127084 | 5/1989 | Japan . |
| 5-123647 | 5/1993 | Japan . |
| 7-9614 | 1/1995 | Japan . |
| 7-163940 | 6/1995 | Japan . |
| 7-180068 | 7/1995 | Japan . |

*Primary Examiner*—Hoa T. Le
*Attorney, Agent, or Firm*—Kenyon & Kenyon

[57] ABSTRACT

A surface-treated steel sheet with a resin-based chemical treatment coating on the steel sheet surface, having poorly soluble chromate colloid particles finely dispersed in a matrix resin such that the mean particle size of the dispersed particles is under 1 μm.

19 Claims, 3 Drawing Sheets

SURFACE-TREATED STEEL SHEET WITH RESIN-BASED CHEMICAL TREATMENT COATING AND PROCESS FOR ITS PRODUCTION

TECHNICAL FIELD

The present invention relates to a resin-based surface-treated steel sheet and a process for its production, and more specifically it relates to a surface-treated steel sheet with a resin-based chemical treatment coating which has excellent corrosion resistance, particularly corrosion resistance at worked sections, and excellent low solubility for hexavalent chromium, as well as a process for its production.

BACKGROUND ART

A common method for improving the corrosion resistance of cold-rolled steel sheets, Zn-plated steel sheets and Zn-based alloy-plated steel sheets used for automobiles, household electronic appliances and building materials involves chromate treatment to form a chromate film. The chromate treatment is accomplished by the electrolyte chromate method or chromate application method. For the electrolyte chromate method, the bath used has been prepared, for example, by adding various anions to a mixture consisting mainly of chromic acid with addition of sulfuric acid, phosphoric acid, boric acid and a halogen, and treating the steel sheet by cathodic electrolysis. The chromate application method is associated with the problem of elution of chromium from the chromate-treated steel sheet, and therefore a method is adopted by which the hexavalent chromium is previously reduced with a reducing agent; for example, there are known sheets coated with an acidic aqueous solution composed mainly of trivalent chromium and containing a water-soluble chromate salt, an inorganic colloid compound and an inorganic anion, and sheets treated with a solution containing an inorganic colloid or inorganic anion with chromic acid of which part of the hexavalent chromium is reduced to trivalent, or chromic acid wherein the hexavalent chromium and trivalent chromium are in a specified ratio. There is also known a method of forming a composite with an organic polymer to immobilize the chromium and a method of further covering the chromate coating with an organic polymer.

Although those chromate coatings which are formed by electrolysis have low elution of chromium, their corrosion resistance cannot be said to be sufficient, while they have also had some problems in terms of scratch resistance of the coating during working and corrosion resistance after working.

Also, when chromate coatings formed by the application method are used in the form as applied, the chromate coating tends to undergo elution. Moreover, the corrosion resistance and coating adhesion have not always been sufficient, while the scratch resistance of the coating during working and corrosion resistance after working are also not always sufficient.

In the case of resin-type chromates, various types of resins are added to the chromic acid bath, at which time such resins gradually undergo reaction by the powerful oxidizing action of the chromic acid, making it difficult to maintain stability in the bath.

Thus, reduction of the hexavalent chromium beforehand in order to minimize chromium elution certainly reduces the corrosion resistance, while it does not completely prevent the chromium elution, and the adhesion is also insufficient. Also, in the chromium reduction method using a reducing organic polymer, the stability of the water-dispersable or water-soluble organic polymer itself becomes poor, while the chromium elution-preventing effect is low. The method of organic polymer coating also involves increased costs brought about by more steps, as well as problems such as chromium elution from damaged sections or cut sections of the coated film and impaired weldability, and for such reasons there have been proposed metal surface-treating compositions such as described in Japanese Unexamined Patent Publication No. 5-230666, which are composed of a mixture of an organic polymer aqueous emulsion of an organic polymer consisting of 0.1–10 wt % of an ethylenic unsaturated carboxylic acid component, 1-30 wt% of a hydroxyl group-containing monomer component and 60–98.9 wt % of another ethylenic unsaturated compound, stably dispersed in an aqueous medium, with a water-soluble chromate salt and an inorganic substance which reacts with an aqueous colloid and amphoteric metal to form a poorly water-soluble salt.

Also, in order to minimize interaction between the chromic acid and the resin, there has been proposed a technique whereby a fine powder of a poorly soluble chromate salt such as $BaCrO_4$ or $SrCrO_4$ is mixed in a resin solution, and a pigment is redispersed therein by mechanical means, for use as a rust-preventive coating (Japanese Unexamined Patent Publication No. 7-180068).

Japanese Unexamined Patent Publication No. 5-230666 mentioned above has a superior aspect in that a resin coating with excellent chromium elution properties is formed without having impaired corrosion resistance, but there are problems with long-term use of the resin coating, such as oxidation of the hydroxyl-containing component by the chromic acid and gelation by interaction between the chromic acid and carboxylic acid component. Also, the chromic acid elution-suppressing effect is believed to be caused by strong interaction of chromium ions with the resin, and when this interaction is too strong, uneven aggregation of the resin layer occurs (excessive interlocking between molecular chains, ion segregation, etc.), and the resulting coating is embrittled thus impairing the chromium elution properties at the worked sections; hence, it cannot be said that the chromium elution properties are adequate.

Furthermore, although the method disclosed in Japanese Unexamined Patent Publication No. 7-180068 involving redispersion of a powdered pigment is superior by rendering the chromium poorly soluble, despite the fine particle size of the primary particles of the pigment, there is a tendency toward aggregation of the pigment to occur during mixture with the resin solution. In addition, because of a tendency toward heteroaggregation with non-resins, the pigment dispersability in the treatment solution is poor, the treatment solution is destabilized due to precipitation of the pigment, and the pigment segregates in the film obtained by the coating, thus inevitably promoting corrosion at the sections with low pigment density. In addition, the pigment with increased particle size as a result of segregation in the coating when it is subjected to working breaks through the coating and exposes the underlying metal, and therefore the corrosion resistance of the worked sections cannot be ensured.

Another possible method is agitation of the solution with a homogenizer or mixer to produce powerful shear forces for redispersion of the aggregated and precipitated pigment in the treatment solution; however, this is not only uneconomical because of the increased number of steps but also results in eventual aggregation of the pigment in the solution, and therefore it essentially fails to provide a solution and does not guarantee stable dispersion throughout the coating.

DISCLOSURE OF THE INVENTION

In the course of diligent efforts to overcome the above-mentioned problems associated with the prior art, the present inventors have discovered that poorly soluble chromate salts ($M'_2CrO_4$, $M''CrO_4$, etc.) are effective for eliminating reaction between the resin and chromium in the treatment solution and rendering the chromium poorly soluble, that smaller particle sizes of the chromate salt in the coating provide superior corrosion resistance provided that the chromate particle content of the coating is the same, that improved dispersion of the chromate salt in the coating provides better corrosion resistance provided that the chromate salt content of the coating is the same and the primary coating particle size is the same, and that the corrosion resistance of the worked sections results in no damage to the coating during working provided that the size of the particles finally incorporated in the coating is sufficiently small and the dispersability is satisfactory, and therefore the chromate particles in the coating must be sufficiently small and the dispersability must be satisfactory.

The dispersability and particle size of the chromate salt in the treatment coating is governed not by the particle size during preparation of the particles, but by the dispersion stability in the final treatment solution and the particle size and uniformity. Consequently, not only for dispersion stability but also for conservation of redispersion energy, it was found effective to produce fine, stable, poorly soluble chromate particles in the solution, i.e. a colloid, and to utilize the steric hindrance or the electrical potential repulsion between the colloid particles to prevent aggregation of the produced colloid while allowing its coexistence with the resin.

The gist of the present invention is as follows.

(1) A surface-treated steel sheet comprising a steel sheet and a resin-based chemical treatment coating, wherein the resin-based chemical treatment coating comprises a matrix resin and colloid particles of a poorly soluble chromate salt dispersed in the matrix resin in a weight ratio range of 50/1 to 1/1, and wherein the colloid particles are less than 1 $\mu m$ in terms of the mean particle size of the particles dispersed in the matrix resin.

(2) A surface-treated steel sheet according to (1), wherein the mean size of the dispersed particles among the colloid particles is 0.30 $\mu m$ or less.

(3) A surface-treated steel sheet according to (1) or (2) above, wherein the chromate salt is any one or more selected from the group consisting of $ZnCrO_4$, $SrCrO_4$, $BaCrO_4$, $CuCrO_4$, $FeCrO_4$, $Ag_2CrO_4$ and $SnCrO_4$.

(4) A surface-treated steel sheet according to (1), (2) or (3) above, wherein the matrix resin includes either or both a block copolymer or telechelic resin which has a skeleton or functional group at one end with affinity for the chromate colloid particles and a skeleton or functional group at another end with affinity for metals and of which the remainder is a hydrophobic molecular skeleton.

(5) A surface-treated steel sheet according to (1), (2) or (3) above, wherein the matrix resin contains a copolymer of a polymer obtained from one or more monomers selected from among hydrophilic vinyl-based carboxylic acids, vinyl-based amines, vinyl-based phosphates and vinyl-based alcohols, and a polymer obtained from one or more hydrophobic vinyl-based compound monomers and/or olefin-based compound monomers, or a polymer which is a polymer obtained from one or more hydrophobic vinyl-based compound monomers and/or olefin-based compound monomers and has a functional group at the end with affinity for metal surfaces.

(6) A surface-treated steel sheet according to (1), (2) or (3) above, wherein the matrix resin comprises a core/shell resin whose core phase is a polymer obtained from one or more hydrophobic vinyl-based compound monomers and/or olefin-based compound monomers, and whose shell phase is one or more polymers with affinity for the chromate colloid particles and for metal surfaces.

(7) A surface-treated steel sheet according to (1), (2) or (3) above, wherein the matrix resin contains a mixture of a polymer obtained from one or more hydrophobic vinyl-based compound monomers and/or olefin-based compound monomers, and a copolymer obtained from one or more hydrophobic vinyl-based compound monomers and/or olefin-based compound monomers and one or more monomers with affinity for water and metals.

(8) A surface-treated steel sheet according to any of (1) to (7) above, wherein one or more additives selected from the group consisting of $Ca(OH)_2$, $CaCO_3$, CaO, $SiO_2$, $Cr_2O_3$, $CrO_3$, $Cr(OH)_{31}$ $CaSiO_3$, $ZrSiO_3$, $TiO_2$, phosphoric acid, phosphates, sulfuric acid and sulfates are added at 0.02–2 parts by weight to 1 part by weight of the matrix resin.

(9) A surface-treated steel sheet according to any of (1) to (7) above, wherein one or more compounds selected from the group consisting of phosphoric acid, phosphates, sulfuric acid and sulfates are added as a colloid stabilizer or passive layer-forming agent at 0.02–2 parts by weight to 1 part by weight of the colloid particles.

(10) A surface-treated steel sheet according to any of (1) to (7) above, which contains 0.005–0.5 parts by weight of a hydrating polymer dispersant with a colloid orienting group at one end and a group which is interactive with metal surfaces at another end, to 1 part by weight of the colloid particles, and wherein the colloid particles are segregated in the coating at the coating/steel sheet interface.

(11) A surface-treated steel sheet according to (10) above, wherein the polymer dispersant is a polymer obtained from a hydrophobic vinyl-based monomer and a hydrophilic vinyl-based monomer, the hydrophobic vinyl-based monomer being one or more selected from the group consisting of styrene, $\alpha$-methylstyrene, vinyl toluene, chlorostyrene and alkyl (meth)acrylates, and the hydrophilic vinyl-based monomer being a polar group-containing monomer.

(12) A process for producing a surface-treated steel sheet which comprises the steps of adding a metal ion-containing aqueous solution to an aqueous chromic acid solution, adjusting the pH of the aqueous solution to 5–12, a chromate colloid being formed during addition of the metal ion or during adjustment of the pH, mixing a dispersion or solution of a resin (preferably a resin according to (4), (5), (6) or (7) above) with the aqueous solution to prepare a resin-based chemical treatment solution, and coating a steel sheet surface with the resin-based chemical treatment solution and drying it to form a resin-based chemical treatment coating on the steel sheet surface.

(13) The process of (12) above which comprises the additional step of adding to the aqueous colloid solution one or more from among i) 0.02–2 parts by weight of one or more compounds selected from the group consisting of $Ca(OH)_2$, $CaCO_3$, CaO, $SiO_2$, $Cr_2O_3$, $CrO_3$, $Cr(OH)_3$, $CaSiO_3$, $ZrSiO_3$, $TiO_2$, phosphoric acid, phosphates, sulfuric acid and sulfates to 1 part by weight of the resin described later, ii) 0.02–2 parts by weight of one or more compounds selected from the group consisting of phosphoric acid, phosphates, sulfuric acid and sulfates as a colloid stabilizer or passive layer-forming agent to 1 part by weight of the chromate colloid, or iii) 0.005–0.5 parts by weight of a hydrating polymer dispersant with a colloid orienting group at one end and a group which is interactive with metal surfaces at another end, to 1 part by weight of the chromate colloid.

(14) A process for producing a surface-treated steel sheet which comprises the steps of preparing an aqueous chromic acid solution adjusted to a pH of 5–12 and adding a metal ion-containing aqueous solution to the aqueous chromic acid solution to form a chromate colloid, mixing a dispersion or solution of a resin (preferably a resin according to (4), (5), (6) or (7) above) in the aqueous solution to prepare a resin-based chemical treatment solution, and coating a steel sheet surface with the resin-based chemical treatment solution and drying it to form a resin-based chemical treatment coating on the steel sheet surface.

(15) The process of (14) above which comprises the additional step of adding to the aqueous colloid solution one or more from among i) 0.02–2 parts by weight of one or more compounds selected from the group consisting of $Ca(OH)_2$, $CaCO_3$, CaO, $SiO_2$, $Cr_2O_3$, $CrO_3$, $Cr(OH)_3$, $CaSiO_3$, $ZrSiO_3$, $TiO_2$, phosphoric acid, phosphates, sulfuric acid and sulfates to 1 part by weight of the resin described later, ii) 0.02–2 parts by weight of one or more compounds selected from the group consisting of phosphoric acid, phosphates, sulfuric acid and sulfates as a colloid stabilizer or passive layer-forming agent to 1 part by weight of the chromate colloid, or iii) 0.005–0.5 parts by weight of an aqueous polymer dispersant with a colloid orienting group at one end and a group which is interactive with metal surfaces at another end, to 1 part by weight of the chromate colloid.

(16) A process for producing a surface-treated steel sheet which comprises the steps of preparing an aqueous emulsion resin or latex of a polymer obtained from one or more hydrophobic vinyl-based compound monomers and/or one or more olefin-based compound monomers, adding a chromic acid solution adjusted to pH 5–12 and an aqueous solution of a metal ion to the emulsion resin or latex to form a chromate colloid, and then adding to the colloid-containing resin solution one or more from among emulsion resins or latexes of i) either or both a block copolymer or telechelic resin which has a skeleton or functional group at one end with affinity for the chromate colloid and a skeleton or functional group at another end with affinity for metals and of which the remainder is a hydrophobic molecular skeleton, ii) a copolymer of a polymer obtained from one or more monomers selected from among hydrophilic vinyl-based carboxylic acids, vinyl-based amines, vinyl-based phosphates and vinyl-based alcohols and a polymer obtained from one or more hydrophobic vinyl-based compound monomers and/or olefin-based compound monomers, or a polymer which is a polymer obtained from one or more hydrophobic vinyl-based compound monomers and/or olefin-based compound monomers and has a functional group at the end with affinity for metal surfaces, or iii) a core/shell resin whose core phase is a polymer obtained from one or more hydrophobic vinyl-based compound monomers and/or olefin-based compound monomers, and whose shell phase is one or more polymers with affinity for the chromate colloid and for metal surfaces, to prepare a resin-based chemical treatment solution, and coating a steel sheet surface with the resin-based chemical treatment solution and drying it to form a resin-based chemical treatment coating on the steel sheet surface.

(17) The process according to (16) above which comprises the additional step of adding one or more from among i) 0.02–2 parts by weight of one or more compounds selected from the group consisting of $Ca(OH)_2$, $CaCO_3$, CaO, $SiO_2$, $Cr_2O_3$, $CrO_3$, $Cr(OH)_3$, $CaSiO_3$, $ZrSiO_3$, $TiO_2$, phosphoric acid, phosphates, sulfuric acid and sulfates to 1 part by weight of the resin described later, ii) 0.02–2 parts by weight of one or more compounds selected from the group consisting of phosphoric acid, phosphates, sulfuric acid and sulfates as a colloid stabilizer or passive layer-forming agent to 1 part by weight of the chromate colloid, or iii) 0.005–0.5 parts by weight of an aqueous polymer dispersant with a colloid orienting group at one end and a group which is interactive with metal surfaces at another end, to 1 part by weight of the chromate colloid, to the colloid-containing emulsion or latex prior to the step of adding the polymer, resin, emulsion or latex of i)–iii) above.

(18) A surface-treated steel sheet produced by any of the processes of (12), (14) or (16) above.

In the surface treatment coating as described above, the chromate colloid in the coating is finely dispersed as a poorly water-soluble salt, thus inhibiting chromium elution out of the coating, and since there is no interaction of the colloid with the resin, it is possible to exhibit the original toughness of the resin even during working such as bending and stretching of the steel sheet, to prevent the chromium elution from worked parts which has presented problems in the past.

Also, since the chromate colloid incorporated into the coating is dissolved by the trigger of pH reduction at areas where corrosion reaction is progressing, chromic acid is selectively released to the corrosion areas, thus providing an anticorrosive function. Consequently, the presence of soluble chromium is limited only to the areas where corrosion is occurring, and thus the amount of chromium elution from the entire coating may be considerably reduced compared to the prior art, without loss of corrosion resistance.

Furthermore, there is no need for the very poorly energy-efficient redispersion step for the pigment powder of the fine particulate chromate salt, and thus an exceptional economical advantage is also provided.

PREFERRED EMBODIMENTS FOR CARRYING OUT THE INVENTION

Figure 1:
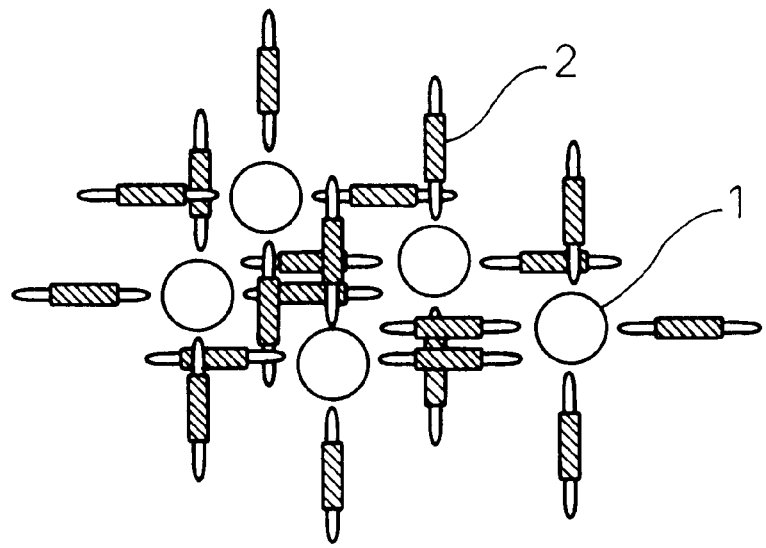
FIG. 1 is a schematic drawing showing the coated state of chromate colloid particles with a block copolymer resin and telechelic resin.

Metal sheets to which the present invention may be applied include zinc-based electrically plated, fusion-plated and vapor deposition-plated steel sheets such as zinc-plated steel sheets, zinc/nickel-plated steel sheets, zinc/iron-plated steel sheets, zinc/chromium-plated steel sheets, zinc/aluminum-plated steel sheets, zinc/titanium-plated steel sheets, zinc/magnesium-plated steel sheets, zinc/manganese-plated steel sheets; aluminum or aluminum alloy-plated steel sheets, lead or lead alloy-plated steel sheets, tin or tin alloy-plated steel sheets, as well as sheets with these plated layers containing traces of heterometal elements or impurities such as cobalt, molybdenum, tungsten, nickel, titanium, chromium, aluminum, manganese, iron, magnesium, lead, antimony, tin, copper, cadmium, arsenic, etc., and/or having an inorganic substance such as silica, alumina or titania dispersed therein. Other possible applications include the multilayer platings with 2 or more of the above-mentioned platings provided in succession, or a complex layer plating of one of the above-mentioned platings in combination with another type of plating such as iron plating, iron/phosphorus plating, etc. Zinc sheets, zinc alloy sheets, aluminum sheets, aluminum alloy sheets, iron sheets and other steel sheets may also be used.

According to the invention, the poorly soluble chromate colloid is prepared basically by a process in which an aqueous solution containing the metal ion which reacts with an aqueous chromic acid solution to form the poorly soluble salt is mixed with the aqueous chromic acid solution to deposit the chromate salt. The colloid particle size may therefore be controlled by known methods such as variation of the mixing rate, temperature, agitation speed, etc.

The aqueous chromic acid solution may be an aqueous solution of anhydrous chromic acid or partially reduced chromic acid reduced by starch, etc. or a dichromate or chromate such as potassium dichromate, ammonium dichromate, sodium dichromate, potassium chromate, ammonium chromate or sodium chromate.

The aqueous solution containing the metal ion which produces a poorly soluble chromate salt by reaction with the aqueous chromic acid solution may be an aqueous solution of a metal such as Zn, Cu, Sr, Ba, Fe, Ag or Sn, as a water-soluble salt such as an acetate, anhydrous acetate, carbonate, carboxylate, phosphonate, sulfate, formate or nitrate or a chloride.

The aqueous chromic acid solution and the aqueous solution containing the metal ion are mixed to form the poorly soluble chromate colloid. The absolute value of the surface potential of the chromate colloid itself may be increased by adjustment of the molar mixing ratio of the chromic acid/metal ion or the pH, or with a colloid stabilizer or a polymer dispersant with an introduced ionic functional group, to thus reinforce the repellency and improve the dispersability of the colloid particles. A specific method for this is described below.

The potential may be controlled by varying the molar mixing ratio of the chromic acid/metal ion when forming the colloid. A chromic acid-rich condition gives a stronger minus potential, while a metal ion-rich condition gives a stronger positive potential. Consequently, the mixed molar ratio of the chromic acid/metal ion of the invention is selected as desired between 0.8 and 1.2, also depending on the mixing stability with the resin combined therewith. At less than 0.8, the polyvalent cation concentration of the metal in the solution increases, thus destabilizing the resin and causing gelation of the treatment solution. At greater than 1.2, more soluble chromic acid results, thus increasing the amount of chromium elution.

In general, a low pH results in a positive surface potential of the colloid particles which is lower with a higher pH, and which switches to negative as the isoelectric point is passed. Since the isoelectric point of the chromate colloid of the invention is less than pH 5, the treatment solution used according to the invention is preferably adjusted to within a final pH of 5–12. At less than 5, not only does aggregation occur but the chromate colloid more readily dissolves, thus increasing the amount of chromium elution. At greater than 12, hydrolysis of the resin in the solution is promoted, causing degeneration of the resin. A more preferred range is 6–10.

Phosphoric acid, phosphate, sulfuric acid, sulfate, sulfate ion or phosphate ion used as a stabilizer for the chromate colloid adheres sulfate ions or phosphate ions to the surface of the chromate colloid particles, conferring a negative potential. Thus, the phosphate or sulfate selected must be a water-soluble salt. These also function simultaneously as passive layer-forming agents. The amount of addition may be at a molar ratio of salt/(colloid-constituting chromate) of 2 or less. At greater than 2, the crystal grains of the salt in the coating become too large, lowering the coating toughness. At less than 0.02 no effect can be expected.

The polymer dispersant adhering to the surface can also confer a potential with ionic functional groups. Any commercially available ionic polymer dispersant may be used in order to ensure dispersion stability of the colloid.

Another method for increasing the dispersability of the chromate colloid makes use of steric hindrance. That is, a resin or a nonionic polymer dispersant in the solution adheres to the colloid, coating the colloid particles and producing steric hindrance to prevent aggregation, and specifically, the method imparts a colloid-affinitive skeleton to part of the resin or dispersant, for adhesion.

The resins listed below may be used. Any commercially available nonionic polymer dispersant may be used in order to ensure dispersion stability of the colloid particles.

The poorly soluble chromate obtained as a colloid in this manner consists of one or more compounds and/or mixtures of $ZnCrO_4$, $SrCrO_4$, $BaCrO_4$, $CuCrO_4$, $FeCrO_4$, $Ag_2CrO_4$, $SnCrO_4$, etc.

The dimensions of the colloid particles are generally considered to be in the range of 1 nm–1 $\mu$m. However, according to the invention it is important to use the resin-based chemical treatment solution with a chromate dispersed as colloid particles, so that the dimensions of the particles during preparation of the colloid substantially constitute the particle size of the dispersed particles of the chromate in the resin-based chemical treatment coating, to allow fine dispersion. That is, the mean particle size of the chromate colloid particles dispersed in the resin-based coating (all of the particles in a dispersed state, although in addition to primary particles there are also present secondary particles resulting from aggregation of the primary particles) may be less than 1 $\mu$m, preferably 0.7 $\mu$m or less, more preferably 0.3 $\mu$m or less, and particularly 0.15 $\mu$m. Also, the weight ratio of the matrix resin and the chromate colloid is preferably 50/1 to 1/1. If it is larger than 50/1 no rust preventive effect of the chromate can be expected, and if it is smaller than 1/1 the coating toughness is compromised.

The size of the colloid particles is preferably sufficiently small with respect to the coating thickness. This is because if the particle size is too large to be incorporated into the resin matrix of the coating, almost all of the colloid particles protrude from the coating surface, and under humid conditions the chromic acid slowly dissolves out as the characteristic dissolution equilibrium is maintained for that substance over a long period, and thus virtually all of the chromate added to the coating dissolves out from the coating. Furthermore, when the coating undergoes working, peeling occurs at the interface between the colloid particles and resin if large particles are present in the coating, and this notably lowers the coverability of the coating. Consequently, colloid particles which are too large make it impossible to maintain the long-term performance of the steel sheet in terms of corrosion resistance of the flat sheet and worked sections, as well as chromium elution.

In other words, in order to maintain long-term corrosion resistance and low chromium elution, the size of the colloid particles must be sufficiently small with respect to the coating thickness so as to be incorporated into the matrix resin.

The thickness of the coating in environments in which the treated steel sheet of the invention is normally used is not particularly limited, but it may usually be about 0.3 $\mu$m to 5 $\mu$m. Consequently, the mean particle size of the colloid particles is preferably 0.3 $\mu$m or less, and more preferably 0.15 $\mu$m or less, depending on the film thickness.

A smaller particle size of the colloid particles is more effective, but if it is too small the specific surface area is great enough to possibly increase the solubility; nevertheless, there is no particular problem with a fineness of the degree prepared by the colloid-production process of the invention. It is currently possible to produce a particle size down to about 0.10 $\mu$m in most cases, but the improved colloid preparation conditions described above may be expected to be adequately produced down to 0.05 $\mu$m.

A matrix resin which may be suitably used according to the invention is one which allows stable dispersion of the colloid particles in the treatment solution.

Figure 2:
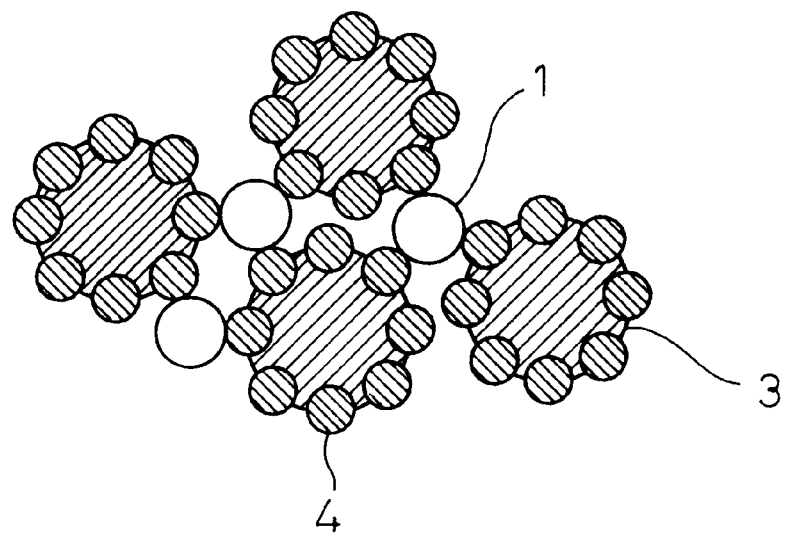
FIG. 2 is a schematic drawing showing stable dispersion of chromate colloid particles with a core/shell-type resin.
Figure 3:
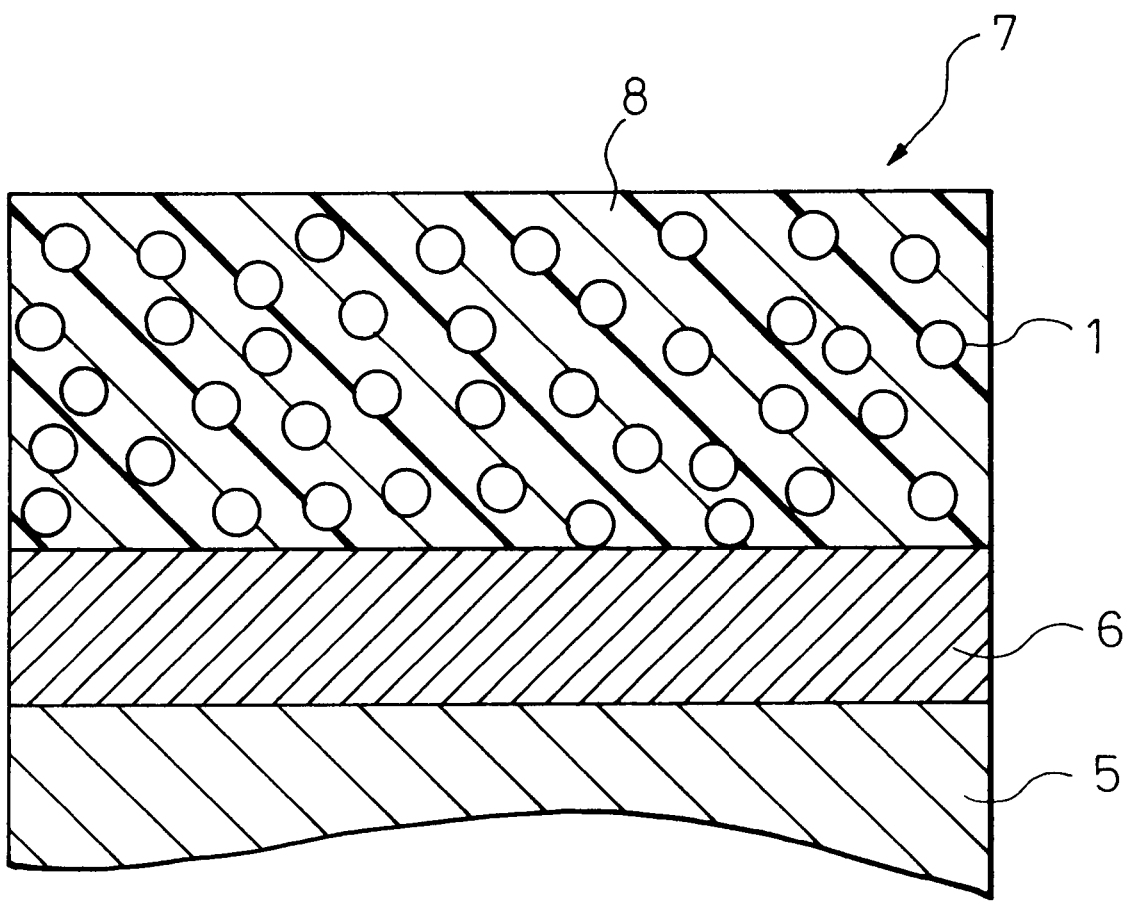
FIG. 3 is a cross-sectional conceptual view of a chemical treatment coating.

When the dispersion stability is provided by steric hindrance, the resin mixed after forming of the chromate colloid is a block copolymer or telechelic resin which has a molecular skeleton or functional group at one end which undergoes interaction with the colloid particle surface by hydrogen bonding, acid-based group bonding, adhesion, etc., and a molecular skeleton or functional group at another end which attaches to the metal material surface by adhesion, hydrogen bonding, etc., with the remainder consisting of a block copolymer or telechelic resin having no affinity for the vehicle and composed of an insolubilized molecular skeleton which does not undergo salvation (hydration), or the resin is a core/shell-type resin with similar structure. FIGS. 1 and 2 show such resin structures. FIG. 1 is a schematic drawing showing the coated state of chromium-containing colloid particles with a block copolymer resin and telechelic resin. As shown in FIG. 1, the block copolymer resin or telechelic resin 2 coats the surface of the chromium-containing colloid particles, thus ensuring stable dispersion of the colloid. FIG. 2 is a schematic drawing showing the coated state of chromium-containing colloid particles with a core/shell-type resin. As shown in FIG. 2, the spherical core/shell-type resin is composed of a core phase 3 and a shell phase 4 covering its surface. The shell phase 4 may cover the surface of the core phase 3 either totally or partially, and the shell phase may comprise adhering fine particles, as shown in the drawing.

The reason for a matrix resin with this type of resin structure is that it provides a skeleton which ensures stable dispersability of the colloid due to the steric protecting effect by adhesion of the resin and which has stable characteristics even when coated, and thus it has gas barrier properties, ion permeation resistance, coating adhesion, fingerprint resistance, adhesion with metal surfaces and workability. A core/shell-type resin is composed of a spherical core phase 3 and a shell phase 4 which covers its surface.

Consequently, this resin structure is preferably used when the purpose is stabilization of dispersion of the colloid by steric hindrance, and the resin composition is a copolymer resin of a monomer which is one or a mixture of 2 or more compounds selected from among vinyl-based compounds and olefin-based compounds, which may be prepared by any of various polymerization methods including solution, bulk, interfacial and emulsion polymerization.

In the case of a water-based vehicle, it is (1) a copolymer resin the major portion of which is a polymer of one or a mixture of 2 or more selected from among hydrophobic vinyl-based monomers and olefin-based monomers, and both ends of which are composed of an organic polymer of a vinyl-based carboxylic acid, vinyl-based amine, vinyl-based phosphate, etc. which has high affinity for the chromate colloid surface and metal surface, or (2) a telechelic resin prepared by using a chain transfer agent in the polymerization process for the non-hydrating (hydrophobic) major skeletal portion to introduce a group at the end which has affinity for the colloid and the metal surface, or (3) an emulsion resin of which the core phase is a polymer of one or a mixture of 2 or more selected from among vinyl-based monomers and olefin-based monomers which do not undergo salvation (hydration) in water, and the shell phase is a polymer of a monomer with high affinity for water and metal surfaces.

As functional groups or skeletons with affinity for the chromate colloid surface, the skeleton may generally have a functional group such as —COOH, —SO$_3$H or —P(O)(OH)$_2$ when the surface potential of the colloid particles is positive, or a functional group such as —NH$_2$ or —NHR when the potential is negative, or irrespective of the surface potential of the colloid, the skeleton may have a functional group such as an alcoholic —OH or phenolic —OH, or a hydrophobic alkyl group.

The functional group which is hydrophilic or has affinity for the metal surface may generally be a functional group such as alcoholic —OH, phenolic —OH, —COOH, —SO$_3$H, —P(O)(OH)$_2$, —NH$_2$, —NHR, etc.

The hydrophobic main skeleton is not particularly limited so long as it is a typical vinyl-based or olefin-based one with no hydrophilic groups.

In the case of these block copolymer resins and core/shell-type resins, the weight ratio of both end portions to the non-hydrating skeletal portion is adjusted to 3/100-1/1, and preferably 1/20-3/10.

According to the invention, it has been found that it is possible to carry out the colloid preparation in a nonionic emulsion or latex, and thereby obtain finer and more stable colloid particles. After forming of the colloid, an additive, colloid stabilizer, passive layer-forming agent or polymer dispersant may be added if necessary, followed by addition of a second resin for increased adhesion of a treatment coating with the steel sheet.

When the treatment solution is prepared by this process, the resin which is mixed first may be a nonionic emulsion or latex. The resin structure thereof may consist of a polymer which is one or a mixture of 2 or more selected from among vinyl-based monomers and olefin-based monomers which do not undergo solvation in water and which have no interaction with metal cations. The dispersing agent or protective colloid used for stabilization of the emulsion resin or latex is preferably nonionic. The reason for this type of resin is that the resin is exposed to an environment where metal cations are present at high concentration during the preparation, and thus to prevent gelation of the resin by its taking on a crosslinked structure due to the metal cations. The second resin to be mixed may be an emulsion resin or latex comprising a polymer obtained from one or more types of monomers with high affinity for water and metals and one or more types monomers of vinyl-based monomers and olefin-based monomers which do not undergo salvation in water. Alternatively, emulsions or latexes of the resins described in (4), (5) or (6) may be used. The reason for this addition is to ensure adhesion with the treatment coating and the metal surface, while the corrosion resistance is also low without it.

Resins other than those mentioned above may also be suitably used as the matrix resin, but addition during preparation of the treatment solution must be carried out without impeding the dispersability of the colloid. Its type is not particularly restricted so long as it has mechanical toughness in environments in which steel sheets are used. Commercially available water-dispersed emulsion resins or latexes are generally preferred.

The range for the minimum film-forming temperature of the matrix resin, including these resins, is preferably between −40° C. and 20° C. If the minimum film-forming temperature is lower than −40° C. the scratch resistance of the coating is impaired, while if it is higher than 20° C. the corrosion resistance of the worked sections is impaired, and the coat drying temperature becomes higher, which is not economical.

Segregation of the colloid particles of the invention on the metal surface using a polymer dispersant also makes it possible to enhance the performance of the steel sheet. By utilizing colloid surface adhesion and steric hindrance of organic substances to ensure stable dispersion of the colloid, and providing functional groups on the outer layer with high affinity for metal surfaces to cause preferential deposition onto the metal surface during application, it was possible to achieve a resin-based chemical coating with the function of corrosion resistance concentrated on the metal surface, in addition to the basic function of the coating.

The polymer dispersant functions as an anchor by adhering to the colloid particle surface, and it has a basic structure with sufficient length to stabilize the colloid particles by steric hindrance, and linkage to a hydrating polymer chain, while the hydrating polymer chain also contains a polar group with strong attachment to metal surfaces to allow preferential deposition onto the metal surface. The polymer dispersant is composed of a polymer of a hydrophobic vinyl-based monomer and a polymer of a hydrating (hydrophilic) vinyl-based monomer, of which the hydrophobic vinyl-based monomer may be one or more selected from among styrene, α-methylstyrene, vinyltoluene, chlorostyrene, alkyl (meth)acrylates, etc. The hydrating (hydrophilic) vinyl-based monomer may be a polar group-containing monomer. The polar group is a proton donor group such as —COOH, —SO$_3$H, —P(O)(OH)$_2$ or —OH, or a proton receptor group such as a salt or ester of the above, or —NH$_2$, —NHR, etc., or a quaternary ammonium group with ionic bonds, or an amphoteric polar group including proton receptor and donor groups; the vinyl-based compound used may have these polar groups introduced alone or in a complex form. The polymer may also be produced using one or more types of these monomers. There is also no problem with introducing these functional groups after polymerization.

Specific examples thereof include styrenesulfonic acid, styrenecarboxylic acid, vinyl phenol, (meth)acrylic acid, vinyl alcohol, vinyl acetate, phosphoric (meth)acrylate, vinyl pyridine, vinyl pyrrolidone, ethyleneimine, ethylene oxide, propylene oxide, ethylene glycol, propylene glycol, vinylphenol sulfonate, dimethylaminomethylene vinyl phenol, diethanolaminomethylene vinyl phenol, vinyl-8-hydroxyquinoline, N-(3-sulfopropyl)-N-methacryloylamidopropyl-N-dimethylammonium betaine, etc. They are water-soluble polymers with a weight ratio of the hydrophobic polymer and hydrophilic polymer of 1/100-1/2, and preferably 1/100-1/5. Also, if the length of the polymers of these resins is too great, the affinity for the aqueous medium becomes too strong causing the dispersant to be attracted by the aqueous medium and become detached from the colloid surface, while if it is even longer then bending occurs on the colloid particle surface, thus compressing the steric hindrance and causing interlocking with other colloid particle-coated polymer chains, which induces re-aggregation of the colloid particles. Considering these factors, the number average molecular weight must be adjusted to 1000–50,000, and preferably 2000–40,000.

Figure 4:
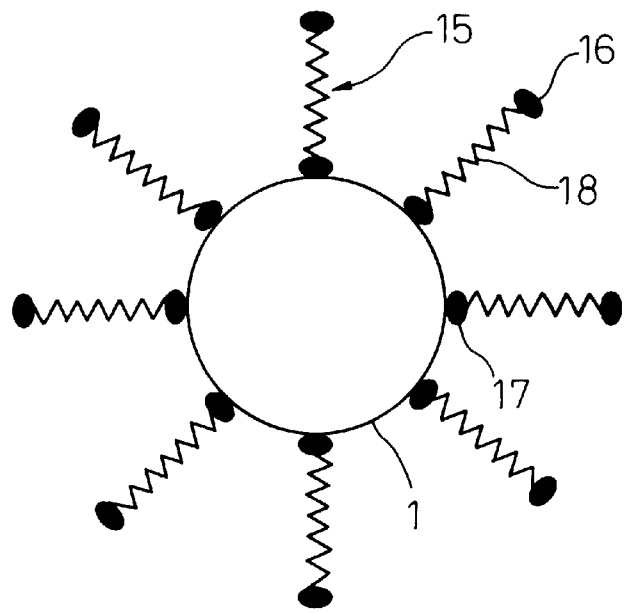
FIG. 4 is a schematic drawing of stable dispersion of a chromate colloid with a polymer dispersing agent.
Figure 5:
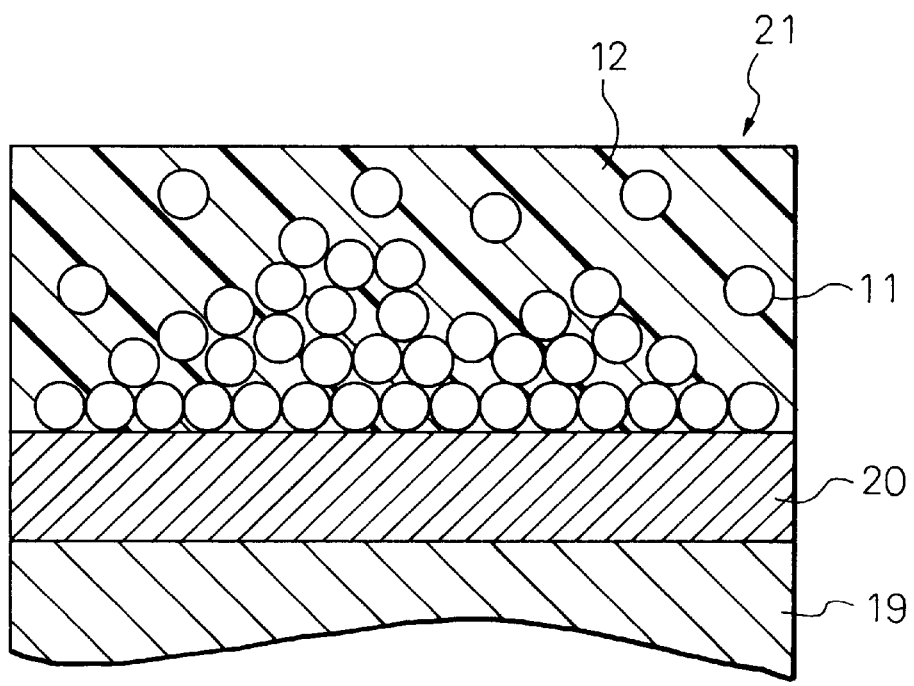
FIG. 5 is a cross-sectional conceptual view of a chemical treatment coating.

FIG. 4 is a schematic drawing of stable dispersion of a chromate colloid with a polymer dispersant. As shown in FIG. 4, in order to ensure dispersability of the chromium-containing colloid in the treatment solution, the resin used is a polymer dispersant, and metal surface selectivity is imparted to this polymer dispersant to form a resin film with the function of corrosion resistance selectively concentrated on the metal surface. Here, the polymer dispersant 15 is composed of a hydrating resin skeleton 18 with a metal surface-affinitive group 16 and a colloid surface-orienting group 17, and it forms a protective barrier around the chromium-containing colloid 1. FIG. 5 is a cross-sectional conceptual view of a chemical treatment coating. As shown in FIG. 5, a plating layer 20 is formed on the surface of the metal 19, a chemical treatment coating layer 21 is formed on the surface thereof, and there is created in the chemical treatment coating layer 21 a state wherein the chromium-containing colloid 11 is dispersed in a matrix resin 12.

For improved functions such as corrosion resistance and the like, one or more compounds from among Ca(OH)$_2$, CaCO$_3$, CaO, SiO$_2$, Cr$_2$O$_3$, CrO$_3$, Cr(OH)$_3$, Zn$_3$(PO$_4$)$_2$, KPO$_3$, Ca$_2$(PO$_4$)$_3$, CaSiO$_3$, ZrSiO$_3$, AlPO$_4$.nH$_2$O, TiO$_2$, Zr$_3$PO$_4$, H$_2$SO$_4$, NaHSO$_4$, Na$_2$SO$_4$, H$_3$PO$_4$, NaH$_2$PO$_4$, Na$_2$HPO$_4$, Na$_3$PO$_4$, etc. are mixed in the treatment solution as other additives. The amount of the inorganic additive is such as to give a matrix resin:inorganic additive (weight ratio) of 1:0.02–1:2. Phosphoric acid may also be used as the passive layer-forming agent. It is added in an amount such as to give a matrix resin:passive layer-forming agent (weight ratio) of 1:0.02–1:2. Other additives may be added, but care must be taken that the dispersability of the colloid is not impaired by this mixing.

The concentration of the matrix resin is adjusted to be 100 g/l or greater and preferably 150 g/l or greater, from the standpoint of film-forming stability.

Regarding the hexavalent chromium in these treatment solutions, the hexavalent chromium may be left in the solution during the process of preparing the chromate-containing colloid, and the concentration of the hexavalent chromium may be adjusted depending on the type of resin used.

Furthermore, since the hexavalent chromium has strong oxidizing power, depending on selected resin types, the readily oxidized portions in the structure (the reducing hydroxy groups such as alkyl alcohols, alcohol amides, etc.) are oxidized, thus resulting in chemical and physical crosslinking between the resin molecule chains. This crosslinking is not desirable as it leads to gelation, etc. in the treatment solution, but since the structure of the solid coating becomes dense, the barrier function would be expected to be improved, thus enhancing the physical properties of the coating. The proportion of resin/hexavalent chromium is preferably adjusted to between 500/1 and 100/1, although it cannot be precisely specified since the degree of oxidation depends on the type of resin.

Application of a resin-based chemical treatment coating prepared in this manner onto a metal sheet and drying gives a surface-treated steel sheet according to the invention. The heating may generally be conducted to an ultimate coating surface temperature of about 50° C. or higher, which attaches the resin to the steel sheet while fusing the resins together to increase the strength of the coating.

As explained above, supplying chromium finely dispersed in a colloid system according to the invention provides a very excellent effect whereby interaction with the resin is minimized, the long-term stability of the application and stability of the coating structure may be ensured and the operation and corrosion resistance of the worked parts are improved; also, since the colloid dissolves with reduced pH and releases hexavalent chromium, the reaction occurs selectively at the corroding areas, a passivation effect is provided, and a selective reparation effect is exhibited at the corroded areas.

EXAMPLES

1. Matrix resin (1) Block copolymer

A poly(methacrylic acid, hydroxyethyl acrylate, hydroxyethyl methacrylate)-poly(styrene, methyl methacrylate, butyl methacrylate, butyl acrylate)-poly(methacrylic acid, hydroxyethyl acrylate, hydroxyethyl methacrylate) block copolymer was produced by the living anion polymerization method. Tetrahydrofuran (THF) was used as the solvent and s-BuLi as the catalyst, with the following monomer charging ratios (by weight):

First stage synthesis (resin ends)—methylmethacrylic acid:hydroxyethyl acrylate:hydroxyethyl methacrylate=3:4:3

Living anion polymerization (resin main portion)—styrene:methyl methacrylate:butyl methacrylate:butyl acrylate=20:10:10:40

Coupling (resin remaining ends)—methyl methylmethacrylate:hydroxyethyl acrylate:hydroxyethyl methacrylate=3:4:3

Reaction temperature: 40–60° C.,

Amount of monomer charged/solvent=2/100

The reaction solvent was poured into petroleum ether and methanol, the block copolymer was purified, the resulting copolymer was dissolved in a polar solvent, after which it was poured into water and vigorously agitated to produce fine particles which were then repeatedly washed with water to remove the solvent for adjustment of the solid concentration of the polymer.

(2) Telechelic resin

In an anion polymerization step for poly(styrene, methyl methacrylate, butyl methacrylate, butyl acrylate), mercaptopropionic acid, mercaptoethanol, etc. was used as a chain transfer agent to introduce hydroxyl groups and carboxyl groups at the ends of the acrylic monomer copolymer.

Styrene (10 parts by weight):hydroxyethyl acrylate (10 parts by weight):butyl methacrylate (15 parts by weight):butyl acrylate (65 parts by weight)

The concentration was adjusted with 500 parts by weight of THF as the solvent and 1.5 parts by weight of 4-4'-azobis (4-cyanopentanic acid) as the polymerization initiator, at a temperature of 80° C.

(3) Core/shell-type emulsion resin

A system of styrene (20 parts by weight):methyl methacrylate (20 parts by weight):butyl methacrylate (10 parts by weight):butyl acrylate (30 parts by weight)-methylmethacrylic acid (6 parts by weight):hydroxyethyl acrylate (8 parts by weight):hydroxyethyl methacrylate (6 parts by weight) was used to obtain a core/shell-type resin.

| Production process: | |
|---|---|
| monomer | 40 parts by weight |
| deionized water | 60 parts by weight |
| SDBS | 0.2 part by weight (sodium dodecyl benzene sulfonate) |
| ammonia persulfate | 0.2 part by weight |
| temperature × time | 70° C. × 8 hr |

(4) Latex

Commercially available nonionic SBR latex containing no functional groups (product of DIC, resin content: 50 wt %)

(5) Carboxyl group-containing latex

Commercially available carboxyl group-containing SBR latex (product of Nihon Synthetic Rubber, resin content: 50 wt %)

2. Chromate colloid-containing resin solution (a) After dissolving 1.5 g of $CrO_3$ in 65 g of water (pH 1.3), 2.75 g of anhydrous zinc acetate or 3.22 g of strontium acetate·0.5 $H_2O$ or 3.83 g of barium acetate was added, the mixture was stirred (temperature: 40° C.) and sodium hydroxide was added to adjust it to pH 7, upon which a zinc chromate colloid, or strontium chromate colloid or barium chromate colloid solution was obtained.

When the above-mentioned resin (1) was mixed with this solution to 200 g/l, it was stable without gelation for at least one month.

Also, when the treatment coating surface obtained by application and drying onto a zinc-plated steel sheet (Silverzinc, product of Nippon Steel) was observed by SEM, the number average particle size of the chromate-containing colloid was found to be 0.3 μm or less.

When the above-mentioned resin was mixed with an aqueous $CrO_3$ solution to 200 g/l, gelation occurred in one day.

(b) After dissolving 1.5 g of $CrO_3$ in 65 g of water (pH 1.3), 2.75 g of anhydrous zinc acetate or 3.22 g of strontium acetate·0.5 $H_2O$ or 3.83 g of barium acetate was added, the mixture was stirred (temperature: 40° C.), and then 10.53 g of Snowtex O (silica gel, product of Nissan Chemicals, solid portion: 20–21%, particle size: 10–20 nm, pH 2–4) was added, and upon stirring the dispersability was satisfactory with no gelation. Sodium hydroxide was added to adjust this solution to pH 7, upon which a zinc chromate colloid, or strontium chromate colloid or barium chromate colloid solution was obtained.

When the above-mentioned resin (2) was mixed with this solution to 200 g/l, it was stable without gelation for at least one month.

Also, when the treatment coating surface obtained by application and drying onto a zinc-plated steel sheet (Silverzinc, product of Nippon Steel) was observed by SEM, the number average particle size of the chromate-containing colloid was found to be 0.3 µm or less.

(c) An alkali other than sodium hydroxide was used as a pH regulator during preparation of the chromate-containing colloid.

After dissolving 1.5 g of $CrO_3$ in 65 g of water (pH 1.3), 2.75 g of anhydrous zinc acetate or 3.22 g of strontium acetate·0.5 $H_2O$ or 3.83 g of barium acetate was added, the mixture was stirred (temperature: 40° C.), and then ammonia water was added to adjust it to pH 7, upon which a zinc chromate colloid, or strontium chromate colloid or barium chromate colloid solution was obtained.

When the above-mentioned resin (3) was mixed with this solution to 200 g/l, it was stable without gelation for at least one month.

Also, when the treatment coating surface obtained by application and drying onto a zinc-plated steel sheet (Silverzinc, product of Nippon Steel) was observed by SEM, the number average particle size of the chromate-containing colloid was found to be 0.3 µm or less.

(d) After dissolving the $CrO_3$ in water, ammonia water was used to adjust it to pH 10, and water was added to adjust the concentration to 0.75 mol/l.

To this aqueous solution there was added 10 cc of a 0.75 mol/l aqueous solution of anhydrous zinc acetate or a 0.75 mol/l aqueous solution of strontium acetate or a 0.75 mol/l aqueous solution of barium acetate, while stirring, to obtain a colloid solution of zinc chromate, strontium chromate or barium chromate.

When the above-mentioned resin (3) was mixed with this solution to 200 g/l, it was stable without gelation for at least one month.

Also, when the treatment coating surface obtained by application and drying onto a zinc-plated steel sheet (Silverzinc, product of Nippon Steel) was observed by SEM, the number average particle size of the chromate-containing colloid was found to be 0.2 µm or less.

(e) To 6 ml of the above-mentioned resin (4), i.e. the nonionic SBR latex, there was added 10 cc of a 0.75 mol/l aqueous solution of anhydrous zinc acetate or a 0.75 mol/l aqueous solution of strontium acetate or a 0.75 mol/l aqueous solution of barium acetate.

Meanwhile, a 0.75 mol/l aqueous $CrO_3$ solution was prepared with the pH adjusted to 10 using ammonia water.

This aqueous chromate solution was added to the above-mentioned latex/metal salt mixture solution while stirring, to obtain a colloid solution of zinc chromate, strontium chromate or barium chromate.

To this solution there was added 0.00375 mole of sodium hydrogen sulfate as a colloid stabilizer, and upon further mixture with a resin to which the above-mentioned resin (5) had already been added, for a total amount of 200 g/l, it was stable without gelation for at least one month.

Also, when the treatment coating surface obtained by application and drying onto a zinc-plated steel sheet (Silverzinc, product of Nippon Steel) was observed by SEM, the number average particle size of the chromate-containing colloid was found to be 0.15 µm or less.

3. Polymer dispersant (A) Synthesis of poly-(styrene)-poly-(styrenesulfonic acid, vinylphenolsulfonic acid)

Styrene and tertiary butyloxycarbonylstyrene, at 20 parts by weight and 30 parts by weight respectively, were subjected to radical polymerization (70° C.×2–16 hr) in 200 parts by weight of a tetrahydrofuran (THF) solvent, using 1 part by weight of the initiator AIBN, after which 2 parts by weight of dichloroparaxylene was added as a reaction terminator, and the reaction solution was dropped into petroleum ether and methanol and then collected and purified. The above-mentioned resin was dissolved in para-dioxane, under an Ar atmosphere, to 15 wt %, trifluoroacetic acid was added, and after refluxing at 60° C. for 15 hours, the reaction solution was dropped into an excess of deionized water and repeatedly washed with water until it reached pH 6, and then vacuum dried at 75° C. for 80 hours. The resin was dissolved in pyridine, and a known method was used for sulfonation using acetyl sulfate as the sulfonating agent. After anion polymerization (60° C.×3 hr) of 5 parts by weight of styrene in a tetrahydrofuran (THF) solvent (200 parts by weight) using s-BuLi as the catalyst, the sulfonated P-(S-vph) was added to the solution for coupling.

(B) Synthesis of poly-(styrene)-poly(styrenesulfonic acid, vinylphenolsulfonic acid, vinylpyridinesulfonic acid)

Styrene, tertiary butyloxycarbonylstyrene and vinylpyridine at 20 parts by weight, 30 parts by weight and 30 parts by weight respectively, were subjected to radical polymerization (70° C.×2–12 hr) in 200 parts by weight of a tetrahydrofuran (THF) solvent, using 1 part by weight of the initiator AIBN, after which 2 parts by weight of dichloroparaxylene was added as a reaction terminator, and the reaction solution was dropped into petroleum ether and methanol and then collected and purified. The above-mentioned resin was dissolved in para-dioxane, under an Ar atmosphere, to 15 wt %, trifluoroacetic acid was added, and after refluxing at 60° C. for 15 hours, the reaction solution was dropped into an excess of deionized water and repeatedly washed with water until it reached pH 7, and then vacuum dried at 75° C. for 80 hours. The resin was dissolved in tetrahydrofuran (THF), and a known method was used for sulfonation using acetyl sulfate as the sulfonating agent. After anion polymerization (60° C.×3 hr) of 5 parts by weight of styrene in a tetrahydrofuran (THF) solvent (200 parts by weight) using s-BuLi as the catalyst, the aforementioned sulfonated P-(S-vph-vpy) was added to the solution for coupling.

(C) Synthesis of poly-(styrene)-poly(styrenesulfonic acid, benzoic vinylsulfonic acid)

Styrene and vinyl benzoate, at 20 parts by weight and 30 parts by weight respectively, were subjected to radical polymerization (70° C.×10–30 hr) in 400 parts by weight of a tetrahydrofuran (THF) solvent, using 1 part by weight of the initiator AIBN, after which 2 parts by weight of dichloroparaxylene was added as a reaction terminator, and the reaction solution was dropped into heptane and then collected and purified. The above-mentioned resin was dissolved in pyridine, and a known method was used for sulfonation using acetyl sulfate as the sulfonating agent. After anion polymerization (60° C.×3 hr) of 5 parts by weight of styrene in a tetrahydrofuran (THF) solvent (200 parts by weight) using s-BuLi as the catalyst, the aforementioned sulfonated P-(S-SCA) was added to the solution for coupling.

Table 1 shows the evaluation of the stability of chromate-containing colloids obtained by using the three types of polymer dispersants (A) to (C) above with different reaction times to adjust the molecular weight. As is evident from Table 1, the dispersants of the invention were able to ensure long-term stability without impairing the dispersion stability of the chromate-containing colloid. Table 2 shows the dispersion stability in the heat-curable aqueous coating material. Since the heat-curable aqueous coating material contains a reactive monomer, catalyst, curing agent, etc., when used it undergoes strong chemical interaction with the pigment surface thus impairing the dispersability thereof, and therefore the dispersion stability of the polymer dispersant-coated chromate-containing colloid according to the invention and the heat-curable aqueous coating material is compared with a chromate-containing colloid without the polymer dispersant. From Table 2 it is seen that dispersion stability can be more reliably provided in the highly reactive aqueous heat-curable coating material by the stable coating of the chromate-containing colloid on the relatively long hydrated molecular chain of the polymer dispersant of the invention.

The reaction times for each of the 3 different polymer dispersants (A) to (C) were varied to adjust the molecular weights, and the influence on the stabilities of the chromate-containing colloids shown in Table 1 was evaluated under the following conditions.

colloid: 60 g/l $ZnCrO_4$, $SrCrO_4$, $BaCrO_4$ dispersant: 15 g/l

Evaluation criteria: * no change for 1 month or more, o small amount of precipitation at 1 month number average molecular weight (Mw): measured by SEC (Size Exclusion Chromatography), converted for polystyrene component analysis: elemental analyzer The comparison of the dispersion stability in the heat-curable aqueous coating material shown in Table 2 was made under the following conditions.

chromate-containing colloid: 60 g/l $ZnCrO_4$, $SrCrO_4$, $BaCrO_4$

Polymer dispersant: 15 g/l

Coating material A: fingerprint-resistant steel sheet coating material (acrylic)

Coating material B: coating material for lubricated steel sheet (urethane-modified epoxy, acrylic)

Evaluation criteria: * stable for 1 month or more, o slight precipitation, Δ gelation at 10–20 days, x gelation within 3 days Visual evaluation after standing at 50° C.

TABLE 1

| Polymer dispersant | | Mw | Component | | | | chromate colloid | Stability |
|---|---|---|---|---|---|---|---|---|
| | | | styrene sulfonic acid | vinyl-phenol-sulfonic acid | vinyl-pyridine-sulfonic acid | styrene | | |
| A | 1 | 1360 | 6 | 4 | — | 2 | $ZnCrO_4$ | * |
| | | | | | | | $SrCrO_4$ | * |
| | | | | | | | $BaCrO_4$ | * |
| | 2 | 4520 | 5 | 5 | — | 2 | $ZnCrO_4$ | o |
| | | | | | | | $SrCrO_4$ | o |
| | | | | | | | $BaCrO_4$ | * |
| | 3 | 59600 | 5 | 5 | — | 2 | $ZnCrO_4$ | o |
| | | | | | | | $SrCrO_4$ | o |
| | | | | | | | $BaCrO_4$ | * |
| B | 1 | 2900 | 6 | 5 | 5 | 1 | $ZnCrO_4$ | * |
| | | | | | | | $SrCrO_4$ | * |
| | | | | | | | $BaCrO_4$ | * |
| | 2 | 5650 | 6 | 5 | 5 | 1 | $ZnCrO_4$ | * |
| | | | | | | | $SrCrO_4$ | * |
| | | | | | | | $BaCrO_4$ | o |
| | 3 | 32700 | 5 | 6 | 5 | 1 | $ZnCrO_4$ | o |
| | | | | | | | $SrCrO_4$ | o |
| | | | | | | | $BaCrO_4$ | * |
| C | 1 | 3100 | 5 | vinyl-benzoic-sulfonic acid 5 | — | 2 | $ZnCrO_4$ | * |
| | | | | | | | $SrCrO_4$ | * |
| | | | | | | | $BaCrO_4$ | * |
| | 2 | 12550 | 4 | 6 | — | 2 | $ZnCrO_4$ | * |
| | | | | | | | $SrCrO_4$ | * |
| | | | | | | | $BaCrO_4$ | * |

TABLE 1-continued

| Polymer dispersant | | Mw | Component | | | | chromate colloid | Stability |
|---|---|---|---|---|---|---|---|---|
| | | | styrene sulfonic acid | vinyl-phenol-sulfonic acid | vinyl-pyridine-sulfonic acid | styrene | | |
| | 3 | 37200 | 4 | 6 | — | 2 | $ZnCrO_4$ | o |
| | | | | | | | $SrCrO_4$ | o |
| | | | | | | | $BaCrO_4$ | * |

TABLE 2

| Polymer dispersant | Heat-curable aqueous coating material | Chromate colloid | Stability |
|---|---|---|---|
| A | 2 | A | $ZnCrO_4$ | * |
| | | | $SrCrO_4$ | * |
| | | | $BaCrO_4$ | * |
| | 2 | B | $ZnCrO_4$ | * |
| | | | $SrCrO_4$ | * |
| | | | $BaCrO_4$ | * |
| B | 2 | A | $ZnCrO_4$ | * |
| | | | $SrCrO_4$ | * |
| | | | $BaCrO_4$ | * |
| | 2 | B | $ZnCrO_4$ | * |
| | | | $SrCrO_4$ | * |
| | | | $BaCrO_4$ | * |
| C | 2 | A | $ZnCrO_4$ | * |
| | | | $SrCrO_4$ | * |
| | | | $BaCrO_4$ | * |
| | 2 | B | $ZnCrO_4$ | * |
| | | | $SrCrO_4$ | * |
| | | | $BaCrO_4$ | * |
| None | | A | $ZnCrO_4$ | x |
| | | | $SrCrO_4$ | x |
| | | | $BaCrO_4$ | Δ |
| None | | B | $ZnCrO_4$ | Δ |
| | | | $SrCrO_4$ | Δ |
| | | | $BaCrO_4$ | Δ |

4. Overall performance test

The polymer dispersant synthesized in 3. above, an additive ($SiO_2$) and a passive layer-forming agent (orthophosphoric acid) were each mixed with the chromate-containing colloid-containing resin solutions prepared in 2. above in the mixing ratios listed in Table 3, and after standing at room temperature for one week, they were applied to zinc-plated steel sheets (Silverzinc, product of Nippon Steel) and dried to form coatings for an overall performance test. The results are given in Table 4.

The chromate pigment used for the comparative examples was prepared from commercially available zinc yellow ($ZnCrO_4$), strontium chromate ($SrCrO_4$) and a $BaCrO_4$ reagent, each with a mean particle size of about 0.3 μm or less obtained by mechanical crushing and mixed in the proportions listed in Table 3; this was followed by stirring for 3 minutes with a handy mixer and then application onto a zinc-plated steel sheet (Silverzinc, product of Nippon Steel) and drying to form a coating for the overall performance test. Although the mean primary particle size of these chromate pigments is 0.3 μm or less, the particles dispersed in the resin-based coating are aggregated particles, the mean particle sizes of which were observed as described below to be larger than about 1.3 μm.

The cross-sectional profiles of the Cr in the coating listed in Table 3 were measured by XPS using spherical polished samples. One hundred cumulative measurements were made with an X-ray photoelectron spectral analyzer (Model PHI-5500, product of Perkin-Elmer), with X-ray source: Mg-Kα (1253.6 eV) 15 kV-27 mA, analysis area: 800 μmφ, chamber vacuum: $2 \times 10^{-8}$ Pa, and Cr2p scanning range: 567–597 eV.

The criteria of the performance evaluation given in Table 4 were as follows.

Chromium elution resistance: Amount of Cr elution after immersion for 30 minutes in boiling water
* <2 mg/m², o 2–7 mg/m², Δ 7–15 mg/m², x>15 mg/m²

SST: white rust
* <2%, o 2–5%, Δ 5–20%, x>20%

Corrosion resistance or worked sections: SST240 time after 7 mm Erichsen working
* <2%, o 2–5%, Δ 5–20%, x>20%

Treatment solution stability
* stable for 1 month or more, o stable for 15 days to 1 month, Δ stable for 3–5 days, x stable for less than 1 day In Examples 25–60 which contained the polymer dispersants according to the invention listed in Table 3, concentrated Cr was found from the metal surface through 20–40% of the coating thickness.

In Examples 1–12 which did not contain polymer dispersants according to the invention, only slight concentrated Cr was found by the metal surface, and an evident difference in the dispersed state of the chromate colloid in the coating was measured in the direction of the cross-section.

Also, as clearly seen from Table 4, the resin coatings with chromate colloid segregation at the metal surface clearly exhibited equal or better performance than the resin coatings with uniform dispersion.

TABLE 3

| No. | Chromate colloid-containing resin solution | Chromate colloid | Chromic anhydride | Chromate pigment | Polymer dispersant | | | Additive (SiO₂) | Passive film-forming agent (o-phosphoric acid) |
|---|---|---|---|---|---|---|---|---|---|
| (present invention) |
| 1 | (a) | ZnCrO₄ 35 g/l | — | — | — | — | — | — | — |
| 2 | (a) | SrCrO₄ 40 g/l | — | — | — | — | — | — | — |
| 3 | (a) | BaCrO₄ 50 g/l | — | — | — | — | — | — | — |
| 4 | (c) | ZnCrO₄ 35 g/l | — | — | — | — | — | — | — |
| 5 | (c) | SrCrO₄ 40 g/l | — | — | — | — | — | — | — |
| 6 | (c) | BaCrO₄ 50 g/l | — | — | — | — | — | — | — |
| 7 | (d) | ZnCrO₄ 35 g/l | — | — | — | — | — | — | — |
| 8 | (d) | SrCrO₄ 40 g/l | — | — | — | — | — | — | — |
| 9 | (d) | BaCrO₄ 50 g/l | — | — | — | — | — | — | — |
| 10 | (e) | ZnCrO₄ 35 g/l | — | — | — | — | — | — | — |
| 11 | (e) | SrCrO₄ 40 g/l | — | — | — | — | — | — | — |
| 12 | (e) | BaCrO₄ 50 g/l | — | — | — | — | — | — | — |
| 13 | (a) | ZnCrO₄ 35 g/l | — | — | — | — | — | 10 g/l | 10 g/l |
| 14 | (a) | SrCrO₄ 40 g/l | — | — | — | — | — | 10 g/l | 10 g/l |
| 15 | (a) | BaCrO₄ 50 g/l | — | — | — | — | — | 10 g/l | 10 g/l |
| 16 | (c) | ZnCrO₄ 35 g/l | — | — | — | — | — | 7.5 g/l | 10 g/l |
| 17 | (c) | SrCrO₄ 40 g/l | — | — | — | — | — | 7.5 g/l | 10 g/l |
| 18 | (c) | BaCrO₄ 50 g/l | — | — | — | — | — | 7.5 g/l | 10 g/l |
| 19 | (d) | ZnCrO₄ 35 g/l | — | — | — | — | — | 10 g/l | 10 g/l |
| 20 | (d) | SrCrO₄ 40 g/l | — | — | — | — | — | 10 g/l | 10 g/l |
| 21 | (d) | BaCrO₄ 50 g/l | — | — | — | — | — | 10 g/l | 10 g/l |
| 22 | (e) | ZnCrO₄ 35 g/l | — | — | — | — | — | 10 g/l | 10 g/l |
| 23 | (e) | SrCrO₄ 40 g/l | — | — | — | — | — | 10 g/l | 10 g/l |
| 24 | (e) | BaCrO₄ 50 g/l | — | — | — | — | — | 10 g/l | 10 g/l |
| 25 | (a) | ZnCrO₄ 35 g/l | — | — | A | 2 | 1 g/l | 10 g/l | 10 g/l |
| 26 | (a) | SrCrO₄ 40 g/l | — | — | A | 2 | 1 g/l | 10 g/l | 10 g/l |
| 27 | (a) | BaCrO₄ 50 g/l | — | — | A | 2 | 1 g/l | 10 g/l | 10 g/l |
| 28 | (c) | ZnCrO₄ 35 g/l | — | — | A | 2 | 1 g/l | 7.5 g/l | 10 g/l |
| 29 | (c) | SrCrO₄ 40 g/l | — | — | A | 2 | 1 g/l | 7.5 g/l | 10 g/l |
| 30 | (c) | BaCrO₄ 50 g/l | — | — | A | 2 | 1 g/l | 7.5 g/l | 10 g/l |
| 31 | (d) | ZnCrO₄ 35 g/l | — | — | A | 2 | 1 g/l | 10 g/l | 10 g/l |
| 32 | (d) | SrCrO₄ 40 g/l | — | — | A | 2 | 1 g/l | 10 g/l | 10 g/l |
| 33 | (d) | BaCrO₄ 50 g/l | — | — | A | 2 | 1 g/l | 10 g/l | 10 g/l |
| 34 | (e) | ZnCrO₄ 35 g/l | — | — | A | 2 | 1 g/l | 10 g/l | 10 g/l |
| 35 | (e) | SrCrO₄ 40 g/l | — | — | A | 2 | 1 g/l | 10 g/l | 10 g/l |
| 36 | (e) | BaCrO₄ 50 g/l | — | — | A | 2 | 1 g/l | 10 g/l | 10 g/l |
| 37 | (a) | ZnCrO₄ 35 g/l | — | — | B | 2 | 1 g/l | 10 g/l | 10 g/l |
| 38 | (a) | SrCrO₄ 40 g/l | — | — | B | 2 | 1 g/l | 10 g/l | 10 g/l |
| 39 | (a) | BaCrO₄ 50 g/l | — | — | B | 2 | 1 g/l | 10 g/l | 10 g/l |
| 40 | (c) | ZnCrO₄ 35 g/l | — | — | B | 2 | 1 g/l | 7.5 g/l | 10 g/l |
| 41 | (c) | SrCrO₄ 40 g/l | — | — | B | 2 | 1 g/l | 7.5 g/l | 10 g/l |
| 42 | (c) | BaCrO₄ 50 g/l | — | — | B | 2 | 1 g/l | 7.5 g/l | 10 g/l |
| 43 | (d) | ZnCrO₄ 35 g/l | — | — | B | 2 | 1 g/l | 10 g/l | 10 g/l |
| 44 | (d) | SrCrO₄ 40 g/l | — | — | B | 2 | 1 g/l | 10 g/l | 10 g/l |
| 45 | (d) | BaCrO₄ 50 g/l | — | — | B | 2 | 1 g/l | 10 g/l | 10 g/l |
| 46 | (e) | ZnCrO₄ 35 g/l | — | — | B | 2 | 1 g/l | 10 g/l | 10 g/l |
| 47 | (e) | SrCrO₄ 40 g/l | — | — | B | 2 | 1 g/l | 10 g/l | 10 g/l |
| 48 | (e) | BaCrO₄ 50 g/l | — | — | B | 2 | 1 g/l | 10 g/l | 10 g/l |
| 49 | (a) | ZnCrO₄ 35 g/l | — | — | C | 2 | 1 g/l | 10 g/l | 10 g/l |
| 50 | (a) | SrCrO₄ 40 g/l | — | — | C | 2 | 1 g/l | 10 g/l | 10 g/l |
| 51 | (a) | BaCrO₄ 50 g/l | — | — | C | 2 | 1 g/l | 10 g/l | 10 g/l |

TABLE 3-continued

| No. | Chromate colloid-containing resin solution | Chromate colloid | Chromic anhydride | Chromate pigment | Polymer dispersant | | | Additive (SiO$_2$) | Passive film-forming agent (o-phosphoric acid) |
|---|---|---|---|---|---|---|---|---|---|
| 52 | (c) | ZnCrO$_4$ 35 g/l | — | — | C | 2 | 1 g/l | 7.5 g/l | 10 g/l |
| 53 | (c) | SrCrO$_4$ 40 g/l | — | — | C | 2 | 1 g/l | 7.5 g/l | 10 g/l |
| 54 | (c) | BaCrO$_4$ 50 g/l | — | — | C | 2 | 1 g/l | 7.5 g/l | 10 g/l |
| 55 | (d) | ZnCrO$_4$ 35 g/l | — | — | C | 2 | 1 g/l | 10 g/l | 10 g/l |
| 56 | (d) | SrCrO$_4$ 40 g/l | — | — | C | 2 | 1 g/l | 10 g/l | 10 g/l |
| 57 | (d) | BaCrO$_4$ 50 g/l | — | — | C | 2 | 1 g/l | 10 g/l | 10 g/l |
| 58 | (e) | ZnCrO$_4$ 35 g/l | — | — | C | 2 | 1 g/l | 10 g/l | 10 g/l |
| 59 | (e) | SrCrO$_4$ 40 g/l | — | — | C | 2 | 1 g/l | 10 g/l | 10 g/l |
| 60 | (e) | BaCrO$_4$ 50 g/l | — | — | C | 2 | 1 g/l | 10 g/l | 10 g/l |
| (comparative examples) | | | | | | | | | |
| 61 | Block copolymer | — | 20 g/l | — | — | — | — | 10 g/l | 10 g/l |
| 62 | Telechelic resin | — | 20 g/l | — | — | — | — | 7.5 g/l | 10 g/l |
| 63 | Core/shell-type emulsion resin | — | 20 g/l | — | — | — | — | 10 g/l | 10 g/l |
| 64 | SBR latex | — | 20 g/l | — | — | — | — | 10 g/l | 10 g/l |
| 65 | Block copolymer | — | — | ZnCrO$_4$ 35 g/l | — | — | — | 10 g/l | 10 g/l |
| 66 | | — | — | SrCrO$_4$ 40 g/l | — | — | — | 10 g/l | 10 g/l |
| 67 | | — | — | BaCrO$_4$ 50 g/l | — | — | — | 10 g/l | 10 g/l |
| 68 | Telechelic resin | — | — | ZnCrO$_4$ 35 g/l | — | — | — | 7.5 g/l | 10 g/l |
| 69 | | — | — | SrCrO$_4$ 40 g/l | — | — | — | 7.5 g/l | 10 g/l |
| 70 | | — | — | BaCrO$_4$ 50 g/l | — | — | — | 7.5 g/l | 10 g/l |
| 71 | Core/shell-type emulsion resin | — | — | ZnCrO$_4$ 35 g/l | — | — | — | 10 g/l | 10 g/l |
| 72 | | — | — | SrCrO$_4$ 40 g/l | — | — | — | 10 g/l | 10 g/l |
| 73 | | — | — | BaCrO$_4$ 50 g/l | — | — | — | 10 g/l | 10 g/l |
| 74 | SBR latex | — | — | ZnCrO$_4$ 35 g/l | — | — | — | 10 g/l | 10 g/l |
| 75 | | — | — | SrCrO$_4$ 40 g/l | — | — | — | 10 g/l | 10 g/l |
| 76 | | — | — | BaCrO$_4$ 50 g/l | — | — | — | 10 g/l | 10 g/l |

Note 1:
Resin concentration: 200 g/l, coat forming temperature: 200° C. × 30 sec, metal: zinc plated steel sheet
Note 2:
Due to a lack of solution stability, the comparative examples were applied immediately after mixture.
Note 3:
The resin solution of Comparative Examples 61–76 contained no chromate colloid

TABLE 4

| No. | Chromate elution resistance | SST (240 hrs) | Corrosion resistance of worked sections | Treatment solution stability |
|---|---|---|---|---|
| 1 | ○ | ○ | ○ | * |
| 2 | ○ | ○ | ○ | * |
| 3 | * | * | * | * |
| 4 | ○ | ○ | ○ | * |
| 5 | ○ | ○ | ○ | * |
| 6 | * | * | * | * |
| 7 | ○ | ○ | ○ | * |
| 8 | * | ○ | ○ | * |
| 9 | * | * | * | * |
| 10 | ○ | ○ | ○ | * |
| 11 | * | * | ○ | * |
| 12 | * | * | * | * |
| 13 | ○ | ○ | ○ | * |
| 14 | * | * | ○ | * |
| 15 | * | * | * | * |
| 16 | ○ | ○ | ○ | * |
| 17 | * | * | ○ | * |
| 18 | * | * | * | * |
| 19 | ○ | ○ | ○ | * |
| 20 | * | * | * | * |
| 21 | * | * | * | * |
| 22 | ○ | ○ | ○ | * |
| 23 | * | * | * | * |
| 24 | * | * | * | * |
| 25 | ○ | ○ | ○ | * |
| 26 | * | * | ○ | * |
| 27 | * | * | * | * |
| 28 | ○ | ○ | ○ | * |
| 29 | * | * | ○ | * |
| 30 | * | * | * | * |
| 31 | * | * | * | * |
| 32 | * | * | * | * |
| 33 | * | * | * | * |
| 34 | * | * | * | * |
| 35 | * | * | * | * |
| 36 | * | * | * | * |
| 37 | ○ | ○ | ○ | * |
| 38 | * | * | ○ | * |
| 39 | * | * | * | * |
| 40 | * | ○ | ○ | * |
| 41 | * | * | ○ | * |
| 42 | * | * | * | * |
| 43 | * | * | * | * |
| 44 | * | * | * | * |
| 45 | * | * | * | * |
| 46 | * | * | ○ | * |
| 47 | * | * | * | * |
| 48 | * | * | * | * |
| 49 | ○ | ○ | ○ | * |
| 50 | * | * | ○ | * |
| 51 | * | * | * | * |
| 52 | ○ | ○ | ○ | * |
| 53 | * | * | ○ | * |
| 54 | * | * | * | * |
| 55 | * | * | ○ | * |
| 56 | * | * | * | * |
| 57 | * | * | * | * |
| 58 | * | * | ○ | * |

TABLE 4-continued

| No. | Chromate elution resistance | SST (240 hrs) | Corrosion resistance of worked sections | Treatment solution stability |
|---|---|---|---|---|
| 59 | * | * | * | * |
| 60 | * | * | * | * |
| 61 | Δ | * | x | x |
| 62 | Δ | * | x | x |
| 63 | Δ | ○ | x | Δ |
| 64 | Δ | * | x | x |
| 65 | x | x | x | x |
| 66 | Δ | x | x | x |
| 67 | ○ | x | x | x |
| 68 | x | x | x | x |
| 69 | Δ | x | x | x |
| 70 | ○ | x | x | x |
| 71 | x | x | x | x |
| 72 | Δ | x | x | x |
| 73 | ○ | x | x | x |
| 74 | x | x | x | x |
| 75 | Δ | x | x | x |
| 76 | ○ | x | x | x |

INDUSTRIAL APPLICABILITY

The surface treated steel sheet with a resin-based chemical treatment coating according to the invention may be applied as a cold-rolled steel sheet, Zn-plated steel sheet, Zn-based alloy-plated steel sheet, etc. for such uses as automobiles, household electrical appliances and construction materials.

We claim:

1. A surface-treated steel sheet comprising a steel sheet and a resin-based chemical treatment coating, wherein said resin-based chemical treatment coating comprises a matrix resin and colloid particles of at least one chromate selected from the group consisting of $ZnCrO_4$, $SrCrO_4$, $BaCrO_4$, $CuCrO_4$, $FeCrO_4$, $Ag_2CrO_4$, and $SnCrO_4$ dispersed in said matrix resin in a weight ratio range of 50/1 to 1/1, and wherein said colloid particles are less than 1 $\mu$m in terms of the mean particle size of the particles dispersed in said matrix resin.

2. A surface-treated steel sheet according to claim 1, wherein the mean particle size of said dispersed colloid particles is 0.30 $\mu$m or less.

3. A surface-treated steel sheet according to claim 1, wherein said matrix resin includes either or both a block copolymer or telechelic resin which has a skeleton or functional group at one end with affinity for said chromate colloid particles and a skeleton or functional group at another end with affinity for metals and of which the remainder is a hydrophobic molecular skeleton.

4. A surface-treated steel sheet according to claim 1, wherein said matrix resin comprises a copolymer of a polymer obtained from one or more monomers selected from among hydrophilic vinyl-based carboxylic acids, vinyl-based amines, vinyl-based phosphates and vinyl-based alcohols, and a polymer obtained from one or more hydrophobic vinyl-based compound monomers and/or olefin-based compound monomers, or a polymer which is a polymer obtained from one or more hydrophobic vinyl-based compound monomers and/or olefin-based compound monomers and has a functional group at the end with affinity for metal surfaces.

5. A surface-treated steel sheet according to claim 1, wherein said matrix resin comprises a core/shell resin whose core phase is a polymer obtained from one or more hydrophobic vinyl-based compound monomers and/or olefin-based compound monomers, and whose shell phase is one or more polymers with affinity for said chromate colloid particles and for metal surfaces.

6. A surface-treated steel sheet according to claim 1, wherein said matrix resin comprises a mixture of a polymer obtained from one or more hydrophobic vinyl-based compound monomers and/or olefin-based compound monomers, and a copolymer obtained from one or more hydrophobic vinyl-based compound monomers and/or olefin-based compound monomers and one or more monomers with affinity for water and metals.

7. A surface-treated steel sheet according to claim 1, which contains one or more additives selected from the group consisting of $Ca(OH)_2$, $CaCO_3$, $CaO$, $SiO_2$, $Cr_2O_3$, $CrO_3$, $Cr(OH)_3$, $CaSiO_3$, $ZrSiO_3$, $TiO_2$, phosphoric acid, phosphates, sulfuric acid and sulfates at 0.02–2 parts by weight to 1 part by weight of said matrix resin.

8. A surface-treated steel sheet according to claim 1, which contains one or more compounds selected from the group consisting of phosphoric acid, phosphates, sulfuric acid and sulfates as a colloid stabilizer or passive layer-forming agent at 0.02–2 parts by weight to 1 part by weight of said colloid particles.

9. A surface-treated steel sheet according to claim 1, which contains 0.005–0.5 parts by weight of a hydrating polymer dispersant with a colloid orienting group at one end and a group which is interactive with metal surfaces at another end, to 1 part by weight of said colloid particles, and wherein said colloid particles are segregated in said coating at the coating/steel sheet interface.

10. A surface-treated steel sheet according to claim 9, wherein said polymer dispersant is a polymer obtained from a hydrophobic vinyl-based compound monomer and a hydrophilic vinyl-based compound monomer, said hydrophobic vinyl-based compound monomer being one or more selected from the group consisting of styrene, α-methylstyrene, vinyl toluene, chlorostyrene and alkyl (meth)acrylates, and said hydrophilic vinyl-based compound monomer being a polar group-containing monomer.

11. A process for producing a surface-treated steel sheet which comprises the steps of adding a metal ion-containing aqueous solution to an aqueous chromic acid solution, said metal ion being at least one selected from the group consisting of Zn, Sr, Ba, Cu, Fe, Ag and Sn, adjusting the pH of said aqueous solution to 5–12, a chromate colloid being formed during said addition of the metal ion or during said adjustment of the pH, with said chromate being at least one selected from the group consisting of $ZnCrO_4$, $SrCrO_4$, $BaCrO_4$, $CuCrO_4$, $FeCrO_4$, $AgCrO_4$, and $SnCrO_4$, with particle size of said chromate colloid being less than 1 $\mu$m in terms of mean particle size, mixing a dispersion or solution of a resin with said aqueous solution to prepare a resin-based chemical treatment solution, and coating a steel sheet surface with said resin-based chemical treatment solution and drying it to form a resin-based chemical treatment coating on the steel sheet surface.

12. The process of claim 11 which comprises the additional step of adding to said aqueous colloid solution one or more from among i) 0.02–2 parts by weight of one or more compounds selected from the group consisting of $Ca(OH)_2$, $CaCO_3$, CaO, $SiO_2$, $Cr_2O_3$, $CrO_3$, $Cr(OH)_3$, $CaSiO_3$, $ZrSiO_3$, $TiO_2$, phosphoric acid, phosphates, sulfuric acid and sulfates to 1 part by weight of the resin described below, ii) 0.02–2 parts by weight of one or more compounds selected from the group consisting of phosphoric acid, phosphates, sulfuric acid and sulfates as a colloid stabilizer or passive layer-forming agent to 1 part by weight of said chromate colloid, or iii) 0.005–0.5 parts by weight of a hydrating polymer dispersant with a colloid orienting group at one end and a group which is interactive with metal surfaces at another end, to 1 part by weight of said chromate colloid.

13. A surface-treated steel sheet produced by the process of claim 11.

14. A process for producing a surface-treated steel sheet which comprises the steps of preparing an aqueous chromic acid solution adjusted to a pH of 5–12, adding a metal ion-containing aqueous solution to said aqueous chromic acid solution to form a chromate colloid, said metal ion being at least one selected from the group consisting of Zn, Sr, Ba, Cu, Fe, Ag and Sn, with said chromate being at least one selected from the group consisting of $ZnCrO_4$, $SrCrO_4$, $BaCrO_4$, $CuCrO_4$, $FeCrO_4$, $Ag_2CrO_4$, and $SnCrO_4$, with particle size of said chromate colloid being less than 1 μm in terms of mean particle size, mixing a dispersion or solution of a resin in said aqueous solution to prepare a resin-based chemical treatment solution, and coating a steel sheet surface with said resin-based chemical treatment solution and drying it to form a resin-based chemical treatment coating on the steel sheet surface.

15. The process of claim 14 which comprises the additional step of adding to said aqueous colloid solution one or more from among i) 0.02–2 parts by weight of one or more compounds selected from the group consisting of $Ca(OH)_2$, $CaCO_3$, CaO, $SiO_2$, $Cr_2O_3$, $CrO_3$, $Cr(OH)_3$, $CaSiO_3$, $ZrSiO_3$, $TiO_2$, phosphoric acid, phosphates, sulfuric acid and sulfates to 1 part by weight of the resin described below, ii) 0.02–2 parts by weight of one or more compounds selected from the group consisting of phosphoric acid, phosphates, sulfuric acid and sulfates as a colloid stabilizer or passive layer-forming agent to 1 part by weight of said chromate colloid, or iii) 0.005–0.5 parts by weight of a hydrating polymer dispersant with a colloid orienting group at one end and a group which is interactive with metal surfaces at another end, to 1 part by weight of said chromate colloid.

16. A surface-treated steel sheet produced by the process of claim 14.

17. A process for producing a surface-treated steel sheet which comprises the steps of preparing an aqueous emulsion resin or latex of a polymer obtained from one or more hydrophobic vinyl-based compound monomers and/or one or more olefin-based compound monomers, adding an aqueous chromic acid solution adjusted to pH 5–12 and an aqueous solution containing a metal ion to said emulsion or latex to form a chromate colloid, said metal ion being at least one selected from the group consisting of Zn, Sr, Ba, Cu, Fe, Ag and Sn, with said chromate being at least one selected from the group consisting of $ZnCrO_4$, $SrCrO_4$, $BaCrO_4$, $CuCrO_4$, $FeCrO_4$, $Ag_2CrO_4$, and $SnCrO_4$, with particle size of said chromate colloid being less than 1 μm in terms of mean particle size, adding to said colloid-containing emulsion or latex one or more from among emulsion resins or latexes of i) either or both a block copolymer or telechelic resin which has a skeleton or functional group at one end with affinity for the chromate colloid and a skeleton or functional group at another end with affinity for metals and of which the remainder is a hydrophobic molecular skeleton, ii) a copolymer of a polymer obtained from one or more monomers selected from among hydrophilic vinyl-based carboxylic acids, vinyl-based amines, vinyl-based phosphates and vinyl-based alcohols and a polymer obtained form one or more hydrophobic vinyl-based compound monomers and/or olefin-based compound monomers, or a polymer which is a polymer obtained from one or more hydrophobic vinyl-based compound monomers and/or olefin-based compound monomers and has a functional group at the end with affinity for metal surfaces, or iii) a core/shell resin whose core phase is a polymer obtained for one or more hydrophobic vinyl-based compound monomers and/or olefin-based compound monomers, and whose shell phase is one or more polymers with affinity for the chromate colloid and for metal surfaces, to prepare a resin-based chemical treatment solution, and coating a steel sheet surface with said resin-based chemical treatment solution and drying it to form a resin-based chemical treatment coating on the steel sheet surface.

18. The process of claim 17 which comprises the additional step of adding one or more from among i) 0.02–2 parts by weight of one or more compounds selected from the group consisting of $Ca(OH)_2$, $CaCO_3$, CaO, $SiO_2$, $Cr_2O_3$, $CrO_3$, $Cr(OH)_3$, $CaSiO_3$, $ZrSiO_3$, $TiO_2$, phosphoric acid, phosphates, sulfuric acid and sulfates to 1 part by weight of the resin described below, ii) 0.02–2 parts by weight of one or more compounds selected from the group consisting of phosphoric acid, phosphates, sulfuric acid and sulfates as a colloid stabilizer or passive layer-forming agent to 1 part by weight of said chromate colloid, or iii) 0.005–0.5 parts by weight of an aqueous polymer dispersant with a colloid orienting group at one end and a group which is interactive with metal surfaces at another end, to 1 part by weight of said chromate colloid, to said colloid-containing emulsion or latex prior to the step of adding the polymer, resin, emulsion or latex described in i)–iii) above.

19. A surface-treated steel sheet produced by the process of claim 17.

* * * * *